UNITED STATES PATENT OFFICE.

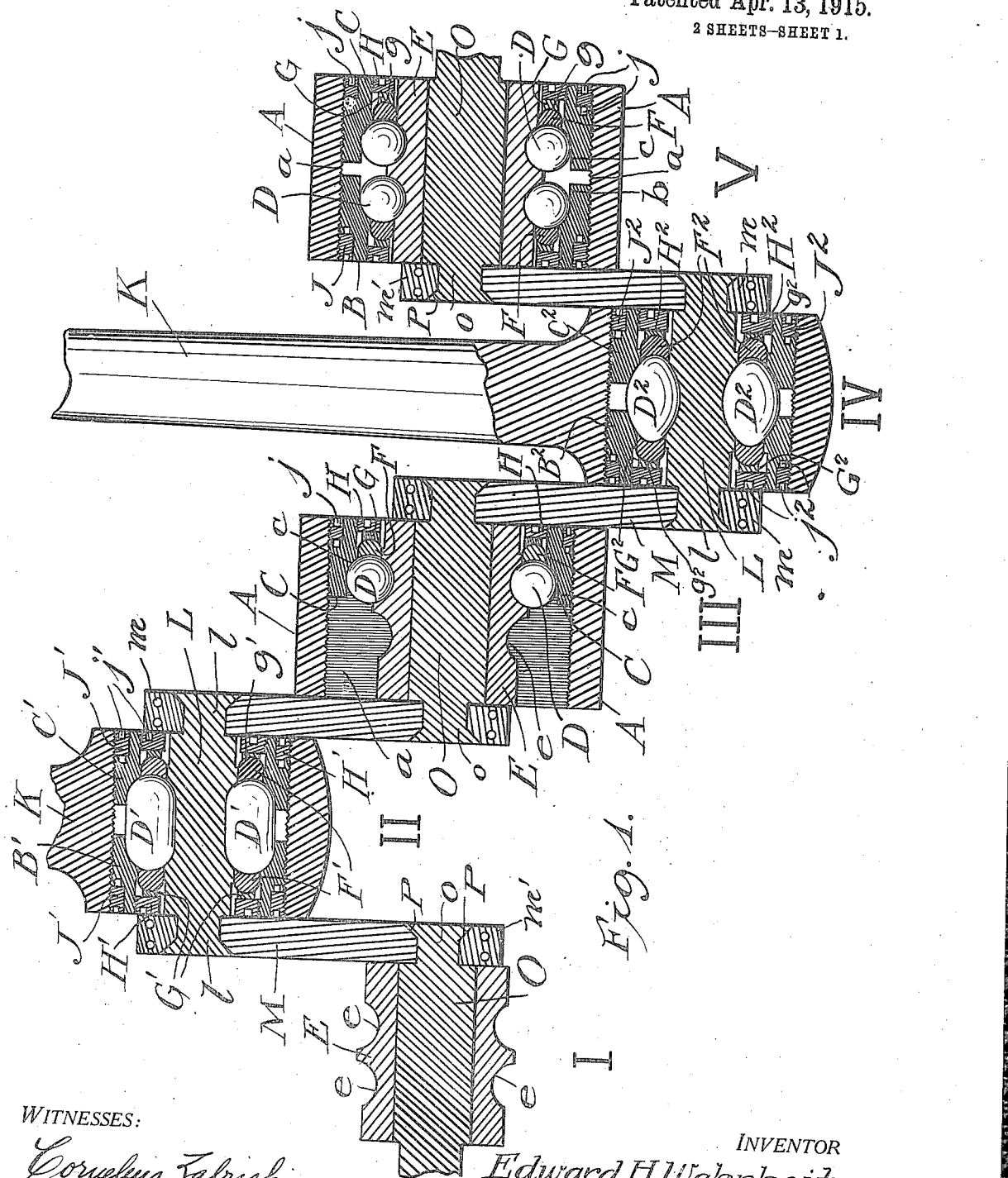

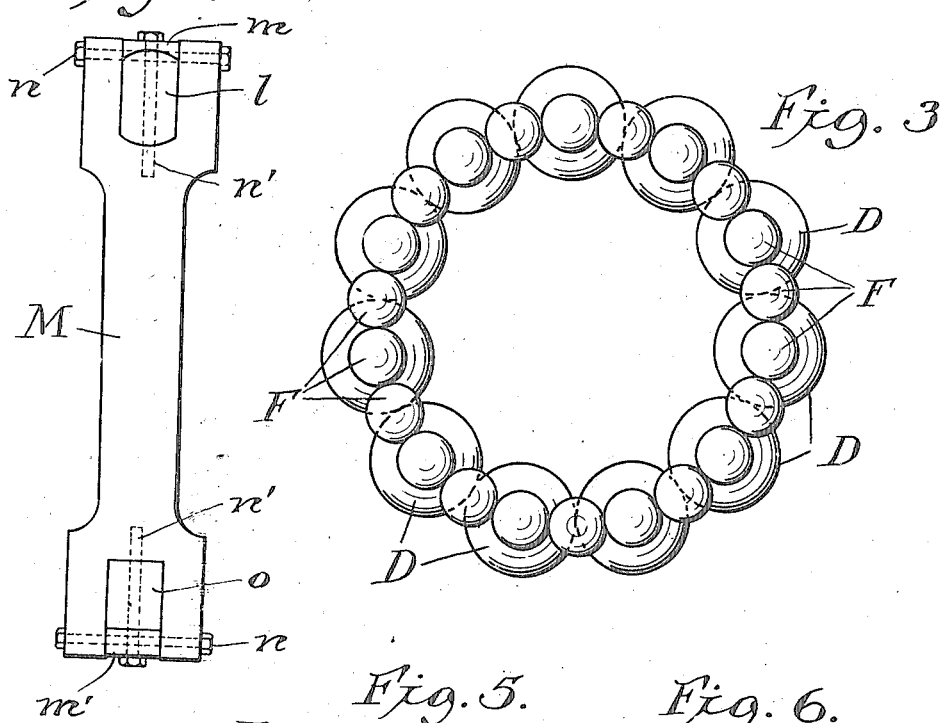

EDWARD H. WAHRHEIT, OF NEW YORK, N. Y.

ANTIFRICTION-BEARING.

1,135,081. Specification of Letters Patent. Patented Apr. 13, 1915.

Application filed March 5, 1913. Serial No. 752,098.

*To all whom it may concern:*

Be it known that I, EDWARD H. WAHRHEIT, a citizen of the United States, residing in the city of New York, borough of Brooklyn, county of Kings, and State of New York, have invented certain new and useful Antifriction-Bearings, of which the following is a specification.

This invention relates to improvements in anti-friction bearings, and, more particularly, to that class of bearings wherein the revolving shaft or core of the bearing is supported on a plurality of solid units, the same being of suitable shape such as spherical, ellipsoidal, or the like.

The present invention embodies anti-friction units of particular form, means whereby the wear of the units, incident to the operation, may be compensated for by certain adjustable parts, thus allowing of maximum efficiency after long continued use.

A salient feature of the invention resides in the employment of secondary bearing units, through which the wear, occasioned as aforesaid, may be taken up, these secondary units further operating to carry any end thrust which the bearing might be subjected to. The bearing is, moreover, provided with suitable locking means which preclude any displacement of the parts after same have been properly adjusted.

In one of the practical forms, the invention embodies an annular incasing ring threaded on its inner periphery for the reception, more particularly, of two exteriorly threaded rings which are adapted to be screwed into the incasing ring from the opposite sides thereof. On the inner faces of these two rings are provided the complementary runs for the bearing units and through the central apertures in either of said rings extends the core of the bearing, the same being provided with a circumferential run in which the bearing units travel in carrying the weight of the shaft within the annular incasing ring. At either side of the bearing units are positioned annularly disposed secondary units, and these units are forced into intimate contact with the main bearing units by means of secondary bearing race members which lie within the respective rings at either side of the bearing to engage the opposite ends of the secondary bearing units and retain them in desired position.

The secondary bearing race members are properly held in place and put under the desired pressure by means of locking rings which screw into the rings at the respective sides of the bearings, and these last mentioned rings, in which are the bearing races of the bearing units, are held in place by locking rings which screw into the inner threading on the incasing ring.

Features of the invention, other than those referred to, will appear from the hereinafter detailed description and appended claims.

In the accompanying drawings I have illustrated different practical embodiments of the invention, but the constructions shown therein are to be understood as illustrative, only, and not as defining the limits of the invention.

Figure 1 shows the application of the invention to an engine crank shaft, the parts being shown in central section. Fig. 2 is an end elevation of a single crank arm of the type shown in Fig. 1. Fig. 3 is a view showing the arrangement of the main bearing units and the manner in which the secondary bearing units coöperate with them. Figs. 4, 5 and 6 are diagrammatic views illustrating the positions which the secondary units have to the main bearing units and the manner in which they operate on the ends thereof. Fig. 7 is an exterior face view of a certain locking member employed. Fig. 8 shows a tapered threaded pin which coöperates with said locking pin for expanding the same and securing it in fixed position.

The present invention may be utilized in many different fields, but, in said drawings, I have shown the same as adapted for use on an engine crank shaft, and, more particularly, a crank shaft of the built-up type. In the drawings, the two anti-friction bearings, at the outer ends of the two crank arms shown, are illustrated as being incorporated or built in the lower end of the connecting rods, while the bearings, which support the longitudinal axis of the crank shaft, are shown as contained in annular rings which may be suitably supported in the usual pillow blocks, not shown.

For convenience and clearness in describing the various forms of bearings shown, I have, in Fig. 1, designated the different bearings, reading from left to right, successively, I., II., III., IV., and V. Referring more particularly to the bearings designated I., III., and V., it will be noted that the three showings illustrate three steps in the assembling of a bearing of one distinct type. This type embodies an annular incasing ring A, which is threaded on its inner periphery, as at $a$, to receive two rings, B and C, which are circumferentially threaded. On the inner faces of these rings B, C, are complementary runs $b$, $c$, for the bearing units D, and extending through the incasing ring A, coaxial therewith, and equal in length to the breadth of said ring, is the core E, of the bearing. This core is in the form of a sleeve which is provided with circumferentially disposed runs $e$, $e$, which coöperate with the runs $b$, $c$, for holding the bearing units D in proper position to carry the load to which the bearing is subjected.

In the orifice between the interior periphery of the bearing rings B, C, and the outer circumference of the sleeve E, auxiliary bearing units F, of the roller variety, are positioned in the manner shown in Fig. 3. These auxiliary units are shaped on the side they contact with the main units so as to alternately fit over and between said main units (see Fig. 4), and those that fit thereover may be made integral with said main units, if desired. On their opposite sides, said auxiliary units are shaped semi-spherical so that they are adapted to travel in the runs $g$, in auxiliary bearing rings G, inserted from either side of the bearing into the orifices aforesaid. The auxiliary bearing rings G are held against displacement by means of circumferentially threaded locking rings H (Figs. 7 and 8), which screw into interiorly threaded portions on the inner peripheries of the rings B, C. These locking rings are in the form of a split ring, and, at the point where said ring is split, as at $h$, a threaded tap $i$, is provided, into which a tapered threaded pin I is adapted to be screwed, whereby the ring H is expanded and thus locked against working loose. A locking ring J, similar in all respects, except size, to the ring H, is utilized for retaining the main bearing rings B, C, in place. Moreover, the locking rings H, J, as well as the rings B, C, are provided with depressions $j$, on their outer faces, so that an adjusting tool, such as a spanner, may be inserted to properly adjust the said parts. In this embodiment of the invention, I utilize ball-bearings, and, in order to gain maximum efficiency and bearing surface to minimize wear, two rows of these bearing units are employed. It will be further noted, from the drawings, that the auxiliary bearing units are, preferably, substantially one-half the diameter of the main bearing units, so that they will be better adapted to alternately fit over, and between, said main bearings (see Fig. 4).

It will be manifest from the foregoing description, that, when the various parts of the anti-friction device are properly adjusted, and locked in position, the core is free to revolve within its incasing parts, its weight being sustained by the spherical units which are securely held in place so that they will ride in the races $b$, $c$, in the rings B, C, and in the races $e$, $e$, in the core E. Moreover, it will be seen that the auxiliary units F will operate to take up any lost motion and, at the same time, carry the end thrust on the core. In this embodiment of the invention, the annular incasing rings A are shown as adapted to rest in the pillow blocks (not shown) usually employed to support a crank shaft, and may be securely clamped therein, while the sleeve E is adapted to be securely fixed on the bearing portions O of the crank shaft.

In the embodiments of the invention illustrated in the bearing units II. and IV., the bearing parts are shown as incased directly within the open lower end of an engine connecting rod K. These embodiments, II. and IV., embrace all the essential features inherent in the aforedescribed type of bearing unit, except that the dual ball feature and the sleevelike core of the first mentioned type, are replaced in the latter style by a single row of elongated main bearing units, and the core of said second style bearing is, in reality, the revolving pin L. The oblate spheroidal or ellipsoidal units $D'$, $D^2$, of the IIth. and IVth. embodiments, respectively, are preferred over the dual units, as practically the same result is accomplished in a more efficient and positive manner. This is true in view of the fact that, in these embodiments, the auxiliary units $F'$, $F^2$, engage the opposite sides of the same row of units, instead of different units, as in the dual type. Moreover, this improved feature is provided without any loss of, if not an increase in, bearing surface. In bearing II., the parts corresponding to B, C; G, $g$; H; and J, $j$, in types I., III., and V., are designated $B'$, $C'$; $G'$, $g'$; $H'$; and $J'$, $j'$, respectively, and the corresponding parts in bearing IV. are marked $B^2$, $C^2$; $G^2$, $g^2$; $H^2$, and $J^2$, $j^2$, respectively.

The application of the invention as herein shown and described is to an engine crank shaft and this application forms a distinct feature of the present invention. The cores L, L, of the bearing devices II., IV., at the lower ends of the connecting rods K, K, are so formed that they protrude beyond the faces of said devices, as at $l$, so that, when these projecting portions are connected to like projecting portions, on the shaft portions O, the resulting member will comprise an engine crank shaft. It will thus be seen that the cores L become the crank pins, the shaft portions O, the crank shaft bearing portions, and the connecting bars M, the cranks. A detail of one of these cranks is shown in Fig. 2, of the drawings, as comprising a bar M, bifurcated at both ends to receive the aforesaid projecting portions $l$, $o$; filling pieces $m$, $m'$; bolt or other suitable securing means $n$, for retaining said filling pieces in proper position relative to the bifurcated ends of the crank; and bolts $n'$ passing through said filling pieces and projecting portions, and inclosed in the crank ends for rigidly securing the parts together. Moreover, said projecting portions, of the crank pins and shaft sections, are outwardly flared, as at P, and the ends of the cranks M, and filling pieces $m$, $m'$, are complementarily cut away so as to further obviate any tendency to rack. This arrangement of elements provides a built-up crank shaft utilizing portions of its anti-friction bearing devices, and the whole is so simply assembled or disassembled, that any worn or damaged part thereof may be readily replaced.

The anti-friction bearings which I have shown, while of great utility in their application as herein set forth, are obviously well adapted to many applications; e. g., they may be readily supported within hangers and thus utilized in carrying shafting, or they may be, with slight modification, adapted to automobile wheels or the like. It will, moreover, be obvious that the sleeve and incasing ring features shown, in connection with embodiments I., II., III., may be employed in connection with any of the other embodiments shown. I, therefore, do not care to limit myself to the specific forms of the invention herein shown, to any greater extent than the state of the art may require.

Having thus fully described the invention, what I claim as new and desire to secure by Letters Patent is:—

1. In an anti-friction device, a casing, an annular series of main anti-friction units annularly disposed therein in such manner that each unit thereof will contact with its adjacent units, a plurality of annularly disposed secondary anti-friction units co-axially arranged with respect to the main units in such manner that each secondary unit will contact with its adjacent secondary unit and with at least one of the main units, and inner and outer bearing elements between which the anti-friction units travel.

2. In an anti-friction device, a series of annularly disposed main anti-friction units, twice as many secondary anti-friction units arranged in an annular ring co-axial with respect to the main series and on at least one side thereof, said secondary units being so proportioned and arranged that each successive secondary unit will contact with its adjacent units and with at least one of the main units, and inner and outer bearing elements between which the anti-friction units travel.

3. In an anti-friction device, a series of annularly disposed main anti-friction units, a series of annularly disposed secondary anti-friction units of substantially one-half the size of the main units, said secondary units being so arranged that each secondary unit contacts with its two adjacent secondary units and being so formed that every alternate secondary unit extends for a short distance between each adjacent pair of main units, and the remaining alternate secondary units being shaped to conform to the contour of the main unit, whereby they fit over the ends thereof, and inner and outer bearing elements between which the anti-friction units travel.

4. In an anti-friction bearing, the combination of a housing, a pair of exteriorly threaded rings adapted to screw into said housing from the opposite sides thereof, complementary runs in the inner faces of said rings, a bearing core, a run in said core, a series of main anti-friction units coöperating with the runs in the aforesaid rings and core, an annular series of secondary units equal in number to double that of the main series positioned co-axial therewith, such a series being on either side of the main units in such manner that each secondary unit will contact with its two adjacent secondary units and with at least one of the main units, and means whereby said series of secondary units are held in intimate contact with said main units.

5. In an anti-friction device, an interiorly threaded housing, a pair of exteriorly threaded main bearing rings adapted to be screwed into the housing from the opposite sides thereof, complementary runs in the interior faces of said rings, a core for the bearing, a run in said core, a series of main anti-friction units coöperating with the runs in said rings and core, in combination with an annularly disposed series of secondary anti-friction units arranged at either side of said main series, said secondary units being so shaped that the alternate secondary units of each series extend in between the successive main units, and the remaining secondary units of each series conform to the contour, and fit over the ends, of their adjacent main bearing units, a pair of secondary bearing rings, of smaller diameter than the aforesaid main bearing rings, adapted to be inserted into the housing from the opposite sides thereof, said secondary bearing rings having runs in their inner faces for the secondary bearing units, exteriorly threaded adjusting rings adapted to thread into the main bearing rings from either side of the bearing for the purpose of retaining the secondary bearing units in engagement with the main series, and means for locking the main bearing rings and adjusting rings against working loose.

In testimony whereof I have signed my name to this specification in the presence of two subscribing witnesses.

EDWARD H. WAHRHEIT.

Witnesses:
CORNELIUS ZABRISKIE,
M. C. RODRIGUEZ.